Jan. 20, 1970 J. H. SIMPSON 3,491,286
PANORAMIC RECEIVING AND RECORDING MEANS UTILIZING THE EFFECTS
OF FARADAY ROTATION AND MAGNETIC RESONANCE
Filed Feb. 15, 1968 3 Sheets-Sheet 1

United States Patent Office 3,491,286
Patented Jan. 20, 1970

---

3,491,286
PANORAMIC RECEIVING AND RECORDING MEANS UTILIZING THE EFFECTS OF FARADAY ROTATION AND MAGNETIC RESONANCE
James H. Simpson, Katonah, N.Y., assignor to Singer-General Precision, Inc., a corporation of Delaware
Filed Feb. 15, 1968, Ser. No. 705,791
Int. Cl. G01n 27/00
U.S. Cl. 324—.5                                   4 Claims

ABSTRACT OF THE DISCLOSURE

An elongated "optically pumped" magnetically resonant cell is subjected to a static $H_0$ field having a constant gradient in a direction parallel to the cell's longitudinal axis. The cell's $H_1$ or drive coil input is responsive to spectral frequency signals for inducing a series of corresponding Larmor resonances spatially distributed within the cell along the latter's longitudinal direction. A plane polarized readout light beam is collimated and passed perpendicularly through the cell, but is normally blocked by a crossed polarizer upon exiting. When a magnetic resonance is induced within the cell, the transverse rotating component of magnetization resulting therefrom rotates the readout beam's plane of polarization (the Faraday effect) permitting the readout beam to pass through the crossed polarizer. The emitted light is then imaged on a photosensitive strip to record the location of the magnetic resonance along the cell's longitudinal axis and thereby provide an analog of the input signal's frequency.

BRIEF DESCRIPTION OF THE INVENTION

The present invention relates generally to frequency analyzing devices, and more particularly, to panoramic receiving and recording equipment for monitoring a selected portion of the frequency spectrum to indicate the presence of signals therein.

Prior art panoramic receiving systems usually comprise a tuning element for sweeping or scanning the monitored band in a periodic or cyclic manner. The signal frequencies observed during each scanning cycle are then displayed on a cathode ray tube or recorded directly on magnetic tape or graph paper, In accordance with the principles of the present invetion, all of the frequencies within the band are observed simultaneously and continuously thus eliminating cyclic scanning. As a result, extremely short duration signal frequencies which occur in the time intervals between successive scanning cycles and which are therefore incapable of being detected by prior art panoramic receivers, are easily observed and recorded by the nonscanning panoramic system disclosed herein.

In brief, the subject invention includes an elongated magnetic resonance cell, or a series of effectively separate cells, placed in a gradient magnetic field. Because of the effects of the gradient field each resonance element or cell will be driven into magnetic resonance by a different frequency when an entire input spectrum is applied in parallel to all the cells. The series of magnetic resonant elements therefore comprises frequency selective means for resolving an input spectrum into separate frequency components or channels. A beam of light radiation obtained from a suitable source is directed through the individual resonant element or cells with each cell acting as an optical shutter to pass the light only when a signal at a frequency for which it is magnetically resonant is present in the input spectrum. This mechanism of optical shuttering depends upon the Faraday rotation effect of plane polarized light interacting with a magnetized medium. That is, in accordance with the principles of the invention, the plane of polarization of the incident light beam is made to rotate when a particular resonant element or cell is driven into a condition of magnetic resonance. Through use of a suitable combination of filters such as, for example, a crossed polarizer and analyzer each cell appears opaque to the incident light beam under quiescent conditions. When the input signal includes a frequency component sufficient to induce magnetic resonance in a particular cell, the changing magnetization in the cell causes Faraday rotation of the incident light beat and the cell thus becomes partially transparent and passes light at the appropriate place in the magnetic gradient. The transmitted light is then focused and imaged onto a photosensitive strip moving perpendicularly to the beam of light and the direction of the magnetic gradient to provide a continuous, permanent line recording of the input frequency. If the input signal includes several separate frequencies simultaneously, several corresponding cells or portions of a cell will be driven into magnetic resonance resulting in the transmission of light therethrough respectively and causing corresponding lines or channels on the photosensitive medium to be exposed. The transverse location of each exposed line on the photosensitive strip corresponds to a particular frequency while the intensity of exposure is directly proportional to the input signal's amplitude.

Thus, it is a primary obpect of the present inven‛ion to provide nonscanning panoramic receiving and recording means utilizing the effects of Faraday rotation and magnetic resonance. This and other objects and advantages of the invention will be more readily apparent from a study of the following detailed description in connection with the accompanying drawings.

DETAILED DESCRIPTION OF THE INVENTION

Figure 1:
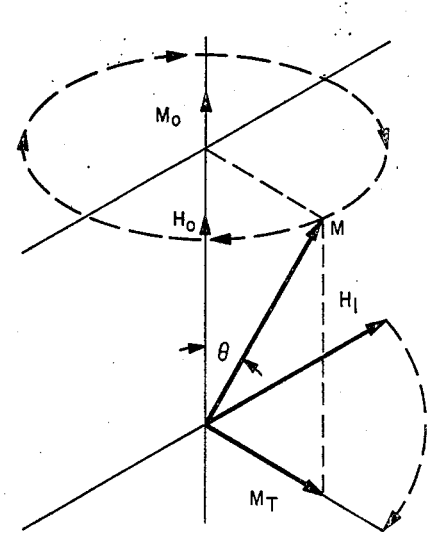
FIGURE 1 is a vector schematic illustrating Larmor precession.

In order to facilitate a proper understanding of the invention, it might be helpful to begin by briefly considering some fundamental aspects of magnetic resonance theory.

From quantum mechanics it is known that certain atomic particles possess a magnetic moment due to their intrinsic angular momentum or spin properties. If a collection or ensemble of such spins is subjected to the influence of a substantially homogeneous static magnetic field $H_0$ the orientations of the magnetic moments will be quantized or split into a series of ground states having predeterminable energy separations. After a time $T_1$, known as the relaxation time, the collection reaches thermal equilibrium at which juncture, slightly more than half of the particles have lined up in a direction parallel to the direction of $H_0$, corresponding to relatively low energy ground states, while the remaining portions have lined up in a direction antiparallel to the magnetic field, corresponding to relatively higher energy ground states.

This is commonly referred to as polarizing or orienting the spin system. Thus, at thermal equilibrium there always exists a small but finite, excess population in the lower energy ground state. For example, in a collection comprising, say 2,000,000 spins in thermal equilibrium at room temperature, 1,000,007 may assume the parallel orientation while the remainder will be oriented in the antiparallel direction. One consequence of this unequal distribution of spins among the various ground state energy levels will be a resultant macroscopic magnetic moment per unit volume in the direction of the applied field $H_0$.

Suppose now, that the polarized spin ensemble is subjected to an alternating magnetic field $H_1$, perpendicular to the $H_0$ field direction, and having substantially the frequency of photon energy necessary to induce transitions from one energy level to another. Each transition between energy levels corresponds to a reorientation of a particle of spin in the magnetic field $H_0$. Therefore, if a particle absorbs sufficient energy to make a transition from a lower energy ground state to an upper energy ground state, it may be said that the particle's orientation changes from parallel to antiparallel as respects the $H_0$ field direction. Since there are more particles in the lower energy state at thermal equilibrium, there is an increased probability that energy will be absorbed from the alternating field causing lower energy particles to make transitions to the higher energy level in a manner tending to equalize the number of particles in each ground state level. During this absorption process, however, the mechanism of relaxation causes sufficient numbers of particles in the higher energy ground state to make incoherent transitions to the lower energy ground state in an effort to restore thermal equilibrium. Hence, the net magnetization of the spin system corresponding to a finite population difference between ground state levels will generally be preserved in the absorption of energy from the $H_1$ source will be continuous. It will be observed that the amount of energy absorbed by the spin system reaches a maximum as the frequency of the applied radiation from the $H_1$ source approaches the frequency of photon energy necessary to induce transitions between quantized energy states. This process is therefore a resonance phenomenon and is commonly referred to as magnetic resonance.

As is often the case in dealing with phenomena involving atomic physics, additional insights may be gained by analyzing the problem of interest within the context of classical mechanics and then comparing the results so obtained with those derived from the quantum theory. Thus, in FIG. 1 there is schematically represented a classical vector model of the magnetic resonance condition. Recalling that at thermal equilibrium there is a finite excess of orientations in the lower energy ground state, the net macroscopic magnetization of the polarized spin ensemble may be indicated by the vector $M_0$ parallel to the magnetic field vector $H_0$. Suppose now that electromagnetic energy in the form of a linearly oscillating magnetic field $H_1$ is applied perpendicularly to the $H_0$ direction. Since a linearly oscillating electromagnetic field may be regarded mathematically as the super-position of two contra-rotating fields, it is sufficient to indicate the applied energy in FIGURE 1 as a single vector $H_1$ rotating in the plane perpendicular to $H_0$ and $M_0$ at the frequency of oscillation since the contra-rotating vector component of $H_1$ will have little or no effect on resonance. The effect of this rotating vector $H_1$ is to apply a torque to $M_0$ causing it to tilt away from $H_0$ and to precess thereabout at a characteristic frequency referred to as the Larmor angular frequency. This Larmor precessional frequency is given by $$\omega_L = \gamma H_0 \quad (1)$$

where $\gamma$, known as the magnetogyric ratio, is a constant relating the properties of magnetic moment and angular momentum associated with each particle in the spin system. If the $H_1$ vector is made to rotate about $H_0$ in synchronism with the precession of the magnetization vector the applied torque will cause the angle $\theta$ between $H_0$ and $M_0$ to increase steadily until the transverse component of magnetization $M_T$ in the plane of rotation reaches a maximum. If, on the other hand $H_1$ rotates with an angular frequency different from the Larmor precessional frequency, or in opposite sense, the torque will vary in magnitude and direction according to the relative phases of the two motions, and will merely produce small perturbations of precessional motion with no net effect. A resonance therefore occurs when the angular frequency of the rotating field $H_1$ is equal to the angular frequency of Larmor precession.

Figure 2:
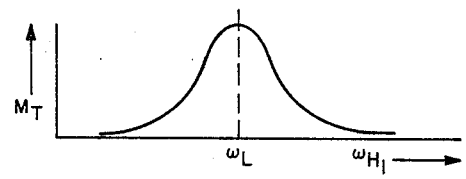
FIGURE 2 is a graphical sketch depicting the transverse component of magnetization as a function of frequency.

It happens that for a given specie of atomic particles the Larmor precessional frequency in a given magnetic field $H_0$ is equal to the frequency of photon energy necessary to induce transitions between the upper and lower energy ground states in the same field; hence, the conditions for magnetic resonance whether viewed classically or on a quantum mechanical basis are the same. Moreover, it is learned from a classical treatment of the problem that the magnetic resonance phenomenon may be observed by detecting and measuring the spin system's precessing transverse component of magnetization ($M_T$) in a plane perpendicular to the direction of $H_0$ field since as shown in FIGURE 2 this component reaches a sharp maximum when the frequency of the applied $H_1$ field is substantially equal to the Larmor precessional frequency.

Figure 3:
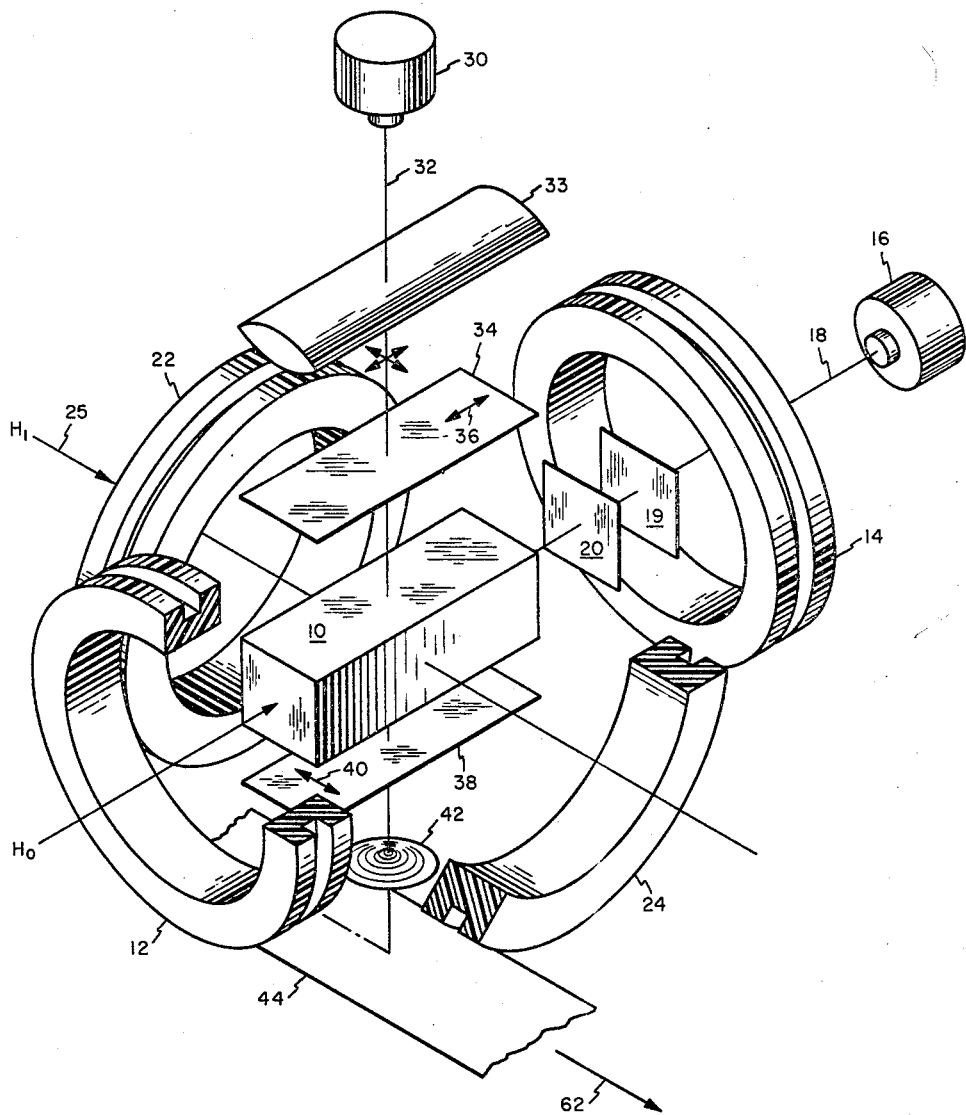
FIGURE 3 is a schematic perspective showing the panoramic system in accordance with the invention.

In the present invention magnetic resonance in an "optically pumped" paramagnetic vapor is utilized to spatially resolve the frequency components of a spectral input signal. As shown in FIGURE 3 a resonance cell 10 is placed in a gradient magnetic field $H_0$ whose intensity varies uniformly from left to right. The field is produced by a pair of conventional gradient field coils 12 and 14 (the former being shown partly broken away from purposes of clarity).

In its preferred form the resonance cell 10 contains a paramagnetic vapor sample comprising atoms of a rubidium isotope, namely $Rb^{87}$, mixed with a $N_2$ buffer gas under a pressure on the order of 20 to 30 torr. The entire cell is fabricated from a transparent non-optically active medium such as Pyrex, for example, and is surrounded by suitable heating means (not shown) for maintaining its contents at a substantially constant temperature of approximately 50° C. As is well understood in the art, the buffer gas minimizes undesirable effects resulting from collisions between the rubidium vapor atoms and the walls of the cell and therefore helps to provide an optimum "optical pumping" enhancement of the rubidium vapor sample.

The term "optical pumping" as applied to the present invention refers to the passage of an intense beam of circularly polarized light through the resonance cell so as to obtain a polarization of the $Rb^{87}$ spin ensemble with an accompanying net magnetization. By utilizing optical pumping it is possible to obtain significantly large polarizations using weak external magnetic fields. Accordingly, in the "optically pumped" cell, relatively large magnetic resonances may be achieved independent of magnetic field and frequency. In conventional magnetic resonance experiments, large fields are required to obtain significant polarizations and therefore the signal-to-noise ratio obtained with low fields and at low frequencies is poor. In addition, as will be explained in more detail below, optical pumping is required to produce significant Faraday rotation displacement of the readout mechanism used in the present invention.

In principle, all alkali metal vapors can be oriented by pumping them with circularly polarized D1 radiation obtained from their own emission spectra. Thus, as schematically shown in FIGURE 3, a spectral "pumping"

lamp 16 is provided for directing a high intensity beam 18 of $Rb^{87}$ D1 (7948 A.) radiation through the resonance cell 10 in the direction of the $H_0$ field. The beam is circularly polarized in a conventional manner by passing it through a linear polarizer 19 and a quarter wave plate 20. A spectral lamp capable of producing the $Rb^{87}$ D1 radiation is fully disclosed in Patent No. 2,975,330 entitled, Electrodeless Discharge Method and Apparatus, and therefore need not be further described herein.

It turns out that since the intense radiation emitted by spectral lamp 16 is substantially at the frequency of photon energy required to raise $Rb^{87}$ from one of its ground states to the excited state, the "pumping" beam 18 interacts strongly with the rubidium atoms in cell 10 through the mechanism known as optical resonance scattering. What actually happens is that the incident radiation "pumps" $Rb^{87}$ atoms from predominately upper energy ground states to the excited state. These excited atoms, however, can return with equal probability to all of the ground states including the lower energy ones. Hence, there results an overpopulation in the lowest energy ground state of $Rb^{87}$ since the latter has the fewest atoms removed therefrom during the "pumping" process. This overpopulation in the lower energy ground state corresponds to a polarization of the ensemble of rubidium atoms in cell 10; or to put it another way, to a macroscopic net magnetization parallel to the direction of $H_0$ field.

In a classical sense, the effect of the circularly polarized beam of resonance radiation is to transfer angular momentum to the collection of spins in the cell. The resulting exchange of angular momentum polarizes or orients the spin system producing a net macroscopic magnetization vector parallel to the $H_0$ magnetic field direction. If, now, electromagnetic radiation is orthogonally applied to the resonance cell relative to the $H_0$ direction and has a frequency given by Equation 1 the net magnetization vector will tilt away from the direction of the magnetic field $H_0$ and precess about this direction at or near the Larmor frequency thus establishing the condition of magnetic resonance.

In the present invention, the resonant inducing electromagnetic radiation is preferably supplied by a conventional pair of Helmholtz coils 22 and 24 (the latter shown partly broken away for purposes of clarity), the common axis of which is arranged perpendicular to the common axis of gradient field coils 12 and 14 as shown. Since coils 22 and 24 are to serve as the input to the panoramic receiver contemplated herein they are adapted to be energized in a known manner by signal frequencies appearing anywhere within a predetermined frequency band being monitored. In response to these signal frequencies, the coils generate corresponding oscillating or varying magnetic fields $H_1$ along the direction indicated by arrow 25. Since as mentioned above, any linearly oscillating magnetic field actually comprises two contra-rotating fields at the same frequency, the magnetic field $H_1$ may be considered to rotate at the received signal or input signal frequency, such rotation occurring in the plane parallel to the gradient field coils 12 and 14 as viewed in FIGURE 3. At a particular location along the length of cell 10 (or the gradient field $H_0$) where the frequency of the applied $H_1$ field is equal to the Larmor resonant frequency of $Rb^{87}$, the magnetization vector created by optical pumping will tilt away from the $H_0$ axis and precess thereabout at the signal frequency. Accordingly, the amplitude of the transverse rotating component of magnetization will reach a sharp maximum at a distinctly different location along the cell (or along the gradient field) depending upon the frequency of the input signal applied to coils 22 and 24.

Figure 4:
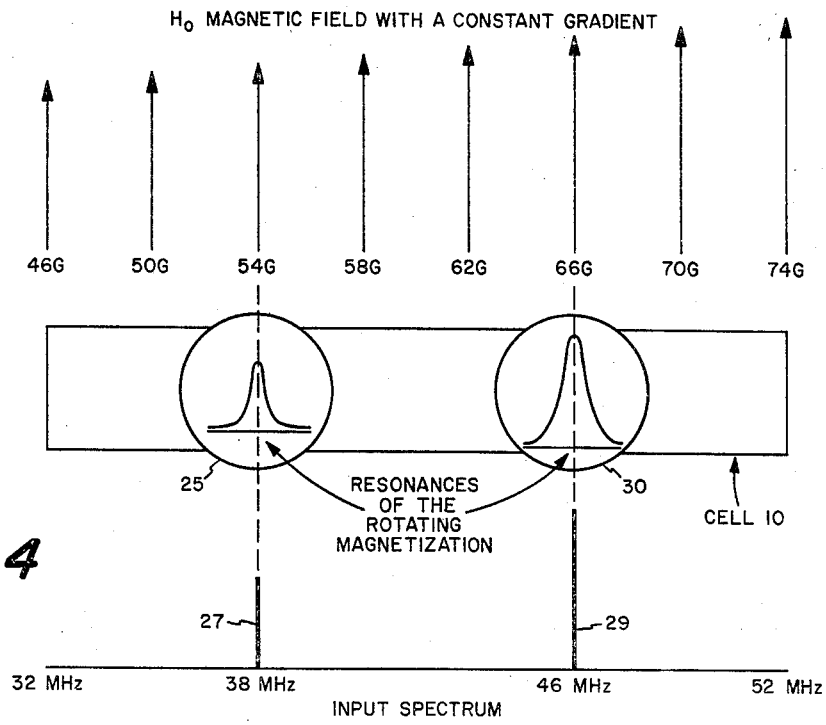
FIGURE 4 is an illustrative example showing the spatial distribution of resonances along the cell.

This transformation from an input spectrum to a spatial distribution of magnetic resonances may be more clearly understood by considering the specific example schematically illustrated in FIGURE 4. As depicted therein, gradient field $H_0$ which is directed along the length of resonance cell 10 varies uniformly from a value of 46 gauss at its left most extremity to a value of 74 gauss at its right most extremity. Recalling from Equation 1 that the Larmor resonant frequency at any point along the cell is given by $\gamma H_0$ and assuming that the value for $\gamma$ for $Rb^{87}$ is very close to 700 kHz. per gauss, it is thus seen that a resonant frequency band from 32 mHz. to 52 mHz. may be resolved by the resonant cell. Suppose now that an input signal comprising frequency components at, say, 38 mHz. and 46 mHz. is impressed upon coils 22 and 24 as indicated by the heavy lines 27 and 29. The 38 mHz. component will produce magnetic resonance in cell 10 corresponding to the location therein where the value of $H_0$ is equal to 54 gauss since substitution into Equation 1 yields $$\frac{38 \times 10^6}{700 \times 10^3} = 54 \qquad (2)$$

The magnitude of the transverse component of this rotating magnetization as a function of input frequency is indicated schematically by the resonance curve inside circle 25. A similar calculation will show that the 46 mHz. input frequency component establishes magnetic resonance at a different location in cell 10, namely where the value of $H_0$ is equal to 66 gauss. The transverse component corresponding to the latter is indicated by the resonance curve inside circle 30. Note that the rotating transverse component of magnetization produced by the 46 mHz. input frequency reaches a greater maximum than that resulting from the 38 mHz. component. This is because the signal intensity of the former was assumed to be greater than the latter as indicated by the difference in height lines 27 and 29. The amplitude of magnetic resonance is therefore proportional to the input signal intensity. Furthermore, it will be apparent from FIG. 4 and the above discussion in conection therewith that the frequency band or range resolved by the resonance cell may be preselected by merely choosing and then applying the $H_0$ field gradient necessary to produce magnetic resonance at frequencies defining the desired range of interest.

In accordance with the principles of the present invention, it is an important feature of the panoramic receiving and recording apparatus disclosed herein to utilize the Faraday rotation effect of plane polarized light in a magnetic medium to increase the optical transmission of the resonance cell whenever a magnetic resonance is produced by the presence of an input frequency applied to coils 22 and 24 as described above.

Plane polarized light behaves in all respects as if it were the resultant of two circularly polarized components of equal amplitude rotating in opposite directions. When the light is passed through a magnetized medium each circularly polarized component effectively sees a different index of refraction, hence, the two components are displaced in phase relative to each other. As a result, the plane of polarization corresponding to the emergent light is rotated in space by an angle $\theta$ proportional to the amount of phase displacement between the circularly polarized components.

In the present invention, the plane polarized light is provided in the form of a beam passing through the cell and referred to as the readout beam while the magnetized medium is provided by the rotating net magnetization achieved whenever a magnetic resonance occurs in the cell.

Thus, turning again to FIGURE 3, a second spectral lamp 30 is schematically shown directing the readout beam 32 through resonance cell 10 in a direction perpendicular to the direction of the magnetic field $H_0$. In comparison to the D1 line of $Rb^{87}$ put out by "pumping" lamp 16, "readout" lamp 30 preferably generates a beam of radiation comprising the D1 line of $RB^{85}$, the readout lamp however is in all other respects identical to the pumping lamp. The reasons for employing the D1 spectral component of $Rb^{85}$ for the readout beam instead of the D1 Rb⁸⁷ radiation will be made more obvious below. Suffice it to say at this point that the readout light beam 32 originating from spectral lamp 30 is collimated by an appropriate lens 33 so that it uniformly illuminates the cell along the latter's entire length. Before entering the cell this beam of light is linearly polarized by a polarizing filter 34 with the result that its E vector remains substantially parallel ot the $H_0$ field as indicated by arrow 36. Upon its exit from the cell the readout beam passes through a second linear polarizer 38 which is oriented with its pass direction perpendicular to that of the linear polarizer 34 as indicated by arrow 40. Thus, if nothing else occurred, the readout beam would pass harmlessly through the resonance cell essentially unchanged with regard to its state of polarization produced by linear polarizer 34 and be blocked by the second or crossed linear polarizer 38. However, if the resonance cell 10 is simultaneously exposed to an oscillating $H_1$ field produced by an appropriate input signal frequency applied to coils 22 and 24 such field will have a frequency sufficient to cause a localized magnetic resonance to occur somewhere along the cell's longitudinal axis. A rotating transverse component of magnetization will thus appear at a corresponding location within the cell precessing about the $H_0$ direction at the frequency of oscillation. The effect of the transverse component of this rotating magnetization upon the linearly polarized readout light beam 32 being directed through the cell parallel to the plane of precession is a sinusoidal modulation of the indices of refraction as seen respectively by the oppositely rotating circularly polarized components of light comprising the beam. Due to the aforementioned Faraday effect, the plane of polarization of the readout light beam leaving cell 10 is rotated or oscillated back and forth at the frequency of precession. Therefore, at the output of polarizer 38 there will appear pulses of light emitted at twice the frequency of the applied $H_1$ field.

The interaction between the readout beam 32 and the collection of atomic spins in cell 10 may be more clearly understood by considering for a moment what happens when a light beam impinges upon a sheet of transparent material. As is well known, in even the most "transparent" of materials a portion of the entering light is removed by a process of absorption, while the remainder although passing completely through the material undergoes what is known as refraction. That is, the light's velocity in the material is less than it would be in a vacuum which latter is assumed to surround the material. The ratio of the velocity of the light in a vacuum to its velocity in the material is called the index of refraction. It is thus seen that the interaction between light and matter can be generally characterized in terms of two coefficients: one describing absorption, and the other the index refraction, each of which are functions of the wavelength (frequency) of the impingent light.

Figure 5A:
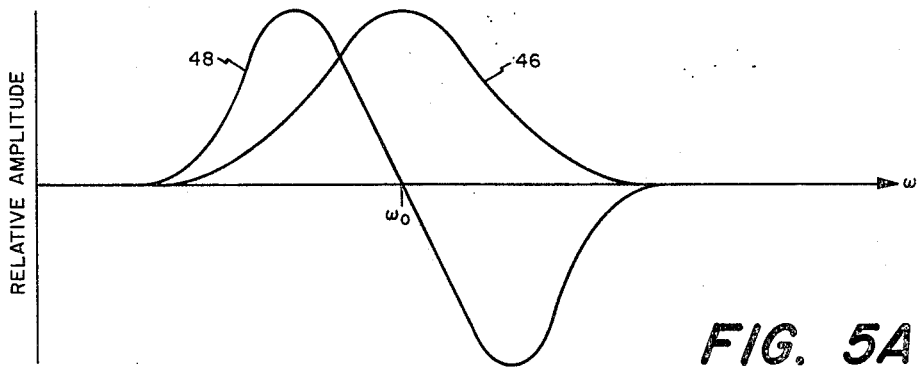
FIGURES 5A and 5B are graphical sketches of the absorption and dispersion curves of $Rb^{87}$.

Viewed microscopically, that is, in terms of what the material's atoms or groups of atoms are doing, absorption takes place when the incident light radiation has a frequency substantially equal to the frequency of photon energy difference between adjacent quantized energy levels. When this condition is met there is a greatly increased probability that energy will be absorbed from the light causing atoms in a low energy ground state level to make transitions to a relatively higher energy excited state level. Thus, for example, in FIGURE 5A there is shown a curve 46 which schematically represents the absorption of energy from the readout beam 32 by the atoms in cell 10. It will be noted that the frequency $\omega_0$ corresponds to the frequency of photon energy coincidental with the spacing between the upper excited state and lower ground state energy levels of Rb⁸⁷ and therefore light radiation having this frequency will interact strongly with the atoms in cell 10 through the process of absorption as indicated by the maximum or peak in curve 46.

Now it is obvious that light which is not absorbed still interacts with the atoms comprising the host material in order to produce the effects of refraction. These last mentioned interactions, however, do not satisfy the principles of conservation of energy; that is, they do not require a coincidence between the frequency of photon energy and the spacing between energy levels as do real transitions. Instead, when the frequency of the incident radiation is off $\omega_0$ (curve 46, FIG. 5A) only relatively weak interactions are possible between light and matter. In these weak interactions or virtual transitions as they are sometimes called photons are not absorbed, but their velocity is changed. It is for this reason that the mechanism of virtual transitions comprise the interaction responsible for refraction phenomena, or more precisely, produce a changing index of refraction as respects the wavelength or frequency of the incident light. The changing index of refraction of matter as a function of the wavelength of the radiation interacting therewith is sometimes referred to as "dispersion" and the curve describing the manner of change is called a "dispersion curve.' Thus, in FIGURE 5A, for example, there is schematically shown a dispersion curve 48 representing the change in index of refraction produced by the weak interaction between the readout light beam 32 and the atoms in cell 10.

Consider now that the spins in cell 10 are exposed to an external magnetic field $H_0$ which splits the ground state hyperfine levels into a plurality of Zeeman sublevels, only two of which need concern us here, namely the lowest energy one and the next one above (adjacent). Also, let it be assumed further that there is negligible Zeeman shift (a valid assumption when low $H_0$ fields are used) and that "optical pumping" is employed to produce a significantly large overpopulation of atoms in the lower energy Zeeman sublevel. It will be recalled that each ground state level refers to a different preferred orientation of spins having a component either parallel or anti-parallel to the direction of the $H_0$ field respectively. Moreover, the readout beam 32 impinging upon cell 10 has been linearly polarized, hence the incident light beam actually comprises two circularly polarized components of equal amplitude rotating in opposite directions. As a result, the right-hand component of circular polarization will tend to interact with the Rb⁸⁷ atoms in the lower energy sublevel in an attempt to cause real and/or virtual transitions to the excited state while the left-hand component of circular polarization will tend to interact with the atoms in the upper energy level in a similar fashion. Now as shown in FIGURE 3, the plane polarized readout beam 32 passes perpendicularly through the cell relative to the $H_0$ field direction. Hence, in the quiescent state, when there are no magnetic resonances induced in the cell and therefore no transverse components of magnetization, each component of circular polarization interacts with an energy level having essentially the same population of atoms. Accordingly, each component of circular polarization sees the same index of refraction. And since there is no relative difference between the indices of refractions corresponding to each component of circular polarization respectively, there is no rotation of the plane of polarization of the readout beam.

However, when the magnetic resonance condition is present somewhere along the cell there will exist at that location a net transverse component of magnetization rotating in a plane parallel to the direction of the readout beam. As a result, the readout beam effectively sees a net magnetization, which, in turn, corresponds to an overpopulation of atoms in the lower ground state energy level. Therefore, at magnetic resonance there is a greatly increased probability that the lower energy ground state level will absorb and disperse more energy from the readout beam than the upper energy ground state level. This is illustrated schematically in FIGURE 5B by the disparity in size between curves 50 and 52 representing on the one hand the relatively strong absorption and dispersion interactions between the right-hand component of polarization and the atoms in the lower energy level, and curves 54 and 56 representing on the other hand the similar but relatively weak interactions between the left-hand component of polarization and the atom in the upper energy level. Since, as mentioned previously, the change in the index of refraction as a function of wavelength may be indicated by the dispersion curve, it is now apparent that during magnetic resonance a significantly different index of refraction will be respectively observed by each circularly polarized component in the readout beam with the difference in indices being proportional to the difference between curves 52 and 56. Moreover, it is reasonably evident from FIGURE 5B that this difference will be greatest when the frequency of the readout beam corresponds substantially to the region of maximum dispersion as indicated, for example, by arrow 60.

Owing to the well known fact that the magnitude of Faraday rotation in a given material is proportional to the difference in the indices of refraction for right and left hand circularly polarized light, it follows that maximum Faraday rotation will be achieved in the present invention when the frequency of the readout beam is substantially centered in the maximum dispersive region of $Rb^{87}$ and "optical pumping" is utilized to produce a large population difference between ground state energy levels leading to a large difference in the indices of refraction. Accordingly, the readout beam 32 in its preferred form comprises radiation consisting primarily of the D1 line of $Rb^{85}$ insofar as the latter has a frequency falling substantially within the maximum dispersion region of $Rb^{87}$.

Figure 5B:
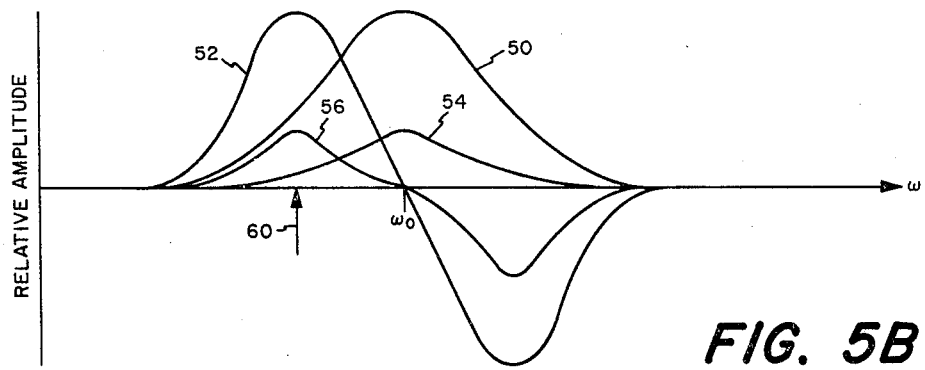

The sinusoidal modulation of the difference in indices of refraction by the rotating component of transverse magnetization at magnetic resonance may be visualized with reference to FIGURE 5B as a periodic dilation and contraction of curves 52 and 56 at the frequency of the input signal applied to coils 22 and 24. That is, curve 56 will increase its amplitude while curve 52 decreases its amplitude until they have both effectively reversed their original positions shown; the process is then repeated in the opposite direction.

As already pointed out this modulation optically shutters the resonance cell by rotating or oscillating the plane of polarization of the readout light beam and thereby permits the latter to pass through polarizer filter 38 in the form of a series of emitted pulses of light. The emitted readout light is then gathered by a suitable lens element 42 and imaged onto a photographic film strip 45. The film strip is positioned relative to cell 10 so that its transverse dimension is generally coextensively parallel to the cell's longitudinal axis as shown in FIGURE 3. Thus, if the film strip is continuously moved in the direction of arrow 62 (FIG. 3) the emitted light will expose lineal portions thereon and provide a continuous recorded "spectroradiogram" of the received signal. A conventional sprocket type film drive mechanism (not shown) is preferred to transport the film strip.

Figure 6:
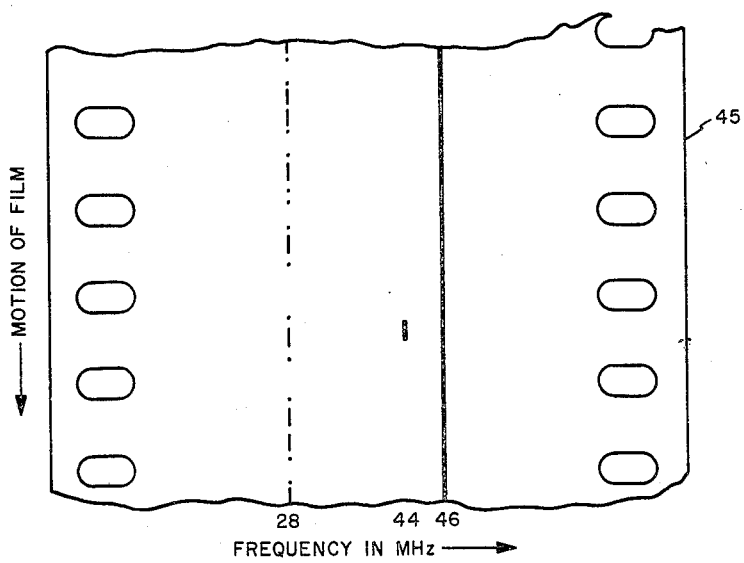
FIG. 6 is a detailed portion of the photosensitive strip employed in the present invention.

If it is assumed that the same spectral input signal is being applied to the input coils 22 and 24 as was discussed above in connection with the illustrative example of FIGURE 4, an exposed portion of film strip 45 might appear as shown in detail in FIGURE 6. The dash-dot formation of the recorded line representing the 38 mHz. signal indicates that the latter has been transmitted in code while the constant intensity signal line representing the received signal at 46 mHz. speaks for itself. The short burst at 44 mHz. points up one of the important advantages of the present invention, namely that extremely short-lived signals may be detected and recorded by the panoramic system disclosed herein. Such bursts exemplify the type of signal activity that is usually missed by prior art panoramic receivers and recorders which must sweep or scan that portion of the frequency spectrum being monitored.

Thus, in view of the foregoing, it will be appreciated that the present invention relates to a nonscanning panoramic receiving and recording system having many advantages over the prior art. By utilizing the effects of magnetic resonance in combination with the optical shutter effect of Faraday rotation, a panoramic receiver has been conceived capable of simultaneously monitoring and recording all the signal frequencies appearing in a preselected portion of the frequency spectrum. And, although a preferred form of the invention was particularly described above in detail, it will be obvious that many modifications and alternations may be made without departing from the basic principles disclosed herein. For example, it is not absolutely essential that the magnetically resonant sample comprise atoms of the alkali metal isotope $Rb^{87}$ in vapor form. Any suitable atomic specie, whether it be in solid, liquid or vaporous form, will satisfy the principles of the invention provided the sample substance incorporates "spin" properties and therefore possesses a magnetic moment. Nor is it absolutely essential that a pair of Helmholtz coils be utilized to provide the energy necessary to induce magnetic resonance. For instance, it may be desirable to monitor frequencies in the microwave region in which case, a broad band microwave coupler such as a waveguide feeding into a flared horn may be used to apply the drive frequencies to the resonance cell.

What is claimed is:
1. Magnetic resonance aparatus comprising,
   means enclosing an ensemble of magnetic moments,
   gradient field magnetic means for subjecting said ensemble to a constant magnetic field uniformly varying along a predetermined direction,
   means for polarizing said ensemble and producing a net magnetization therein substantially parallel to said predetermined direction,
   means responsive to spectral frequency input signals for interacting with said net magnetization to cause transverse components thereof to rotate in a series of spatially separated parallel planes respectively, each of said parallel planes being perpendicular to said predetermined direction, the frequency of rotation in each said parallel plane corresponding to each of said input signal frequencies respectively,
   a beam of plane polarized radiation directed through said ensemble, each of said rotating transverse components of magnetization being adapted to rotate said plane of polarization of said beam, and
   means for sensing said beam only when its plane of polarization is rotated.
2. The apparatus of claim 1 wherein said beam of plane polarized radiation has a frequency falling substantially within the maximum dispersive region corresponding to said magnetic moments.
3. Nonscanning panoramic receiving and recording apparatus comprising in combination,
   an elongated magnetically resonant cell,
   means for enveloping said cell in a static gradient magnetic field varying uniformly along the axial direction of said cell,
   input means responsive simultaneously to various frequency signals for applying a series of rotating magnetic fields to said cell perpendicular to said axial direction, the frequency of rotation of said series of rotating magnetic fields being related respectively to the frequency of the various signals being applied to said input means, each of said rotating fields being effective to induce magnetic resonance in said cell at a different particular location along said axial direction,
   means for directing a beam of plane polarized radiation through said cell in a direction perpendicular to said axial direction, said induced magnetic resonance being effective to rotate the plane of polarization of said beam in space upon the latter's exit from said cell, and means for sensing said beam of radiation only when its plane of polarization is so rotated.

4. The apparatus of claim 3 wherein said last mentioned sensing means includes a photographic film having a transverse dimension coextensively parallel to the axial dimension of said cell and being adapted to be exposed by said beam of radiation, and polarizing filter means between said cell and said photographic film for preventing exposure of said film in the absence of any rotation of the beam's plane of polarization.

References Cited

UNITED STATES PATENTS

| | | | |
|---|---|---|---|
| 2,906,954 | 9/1959 | White | 324—0.5 |
| 3,147,427 | 9/1964 | Varian | 324—0.5 |
| 3,150,313 | 9/1964 | Dehmelt | 324—0.5 |
| 3,378,760 | 4/1968 | Jackson | 324—0.5 |

RUDOLPH V. ROLINEC, Primary Examiner

M. J. LYNCH, Assistant Examiner

U.S. Cl. X.R.

324—77; 350—151

UNITED STATES PATENT OFFICE
CERTIFICATE OF CORRECTION

Patent No. 3,491,286          Dated January 20, 1970

Inventor(s) James H. Simpson

It is certified that error appears in the above-identified patent and that said Letters Patent are hereby corrected as shown below:

Column 1, line 47 after the word paper, delete the comma "," and insert a period --.--.

Column 1, line 68, change the word "element" or read --elements--

Column 2, line 12, change the word "the" (first occurrence) to read --that--.

Column 2, line 13, change the word "beat" to read --beam--.

Column 2, line 29, change the word "obpect" to read --object--.

Column 4, line 39, change the word "from" to read --for--.

Column 7, line 7, the word "ot" should be corrected to read --to

Column 9, line 6, change the word "atom" to read --atoms--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents